(12) United States Patent
Mohaia et al.

(10) Patent No.: US 11,776,013 B2
(45) Date of Patent: Oct. 3, 2023

(54) MACHINE LEARNING-BASED CONTENT PREDICTOR

(71) Applicant: Rokt Pte. Ltd., Singapore (SG)

(72) Inventors: Kanishka Mohaia, Eastwood (AU); Yan Xu, Wentworth (AU)

(73) Assignee: ROKT PTE. LTD., Singapore (SG)

( * ) Notice: Subject to any disclaimer, the term of this patent is extended or adjusted under 35 U.S.C. 154(b) by 299 days.

(21) Appl. No.: 17/116,960

(22) Filed: Dec. 9, 2020

(65) Prior Publication Data

US 2022/0180402 A1 Jun. 9, 2022

(51) Int. Cl.

| | |
|---|---|
| *G06Q 30/0251* | (2023.01) |
| *G06N 5/04* | (2023.01) |
| *G06N 20/00* | (2019.01) |
| *G06F 16/958* | (2019.01) |
| *G06Q 30/0241* | (2023.01) |
| *G06Q 30/0242* | (2023.01) |
| *G06Q 30/0273* | (2023.01) |
| *G06F 40/106* | (2020.01) |

(52) U.S. Cl.
CPC ....... *G06Q 30/0263* (2013.01); *G06F 16/958* (2019.01); *G06F 40/106* (2020.01); *G06N 5/04* (2013.01); *G06N 20/00* (2019.01); *G06Q 30/0246* (2013.01); *G06Q 30/0249* (2013.01); *G06Q 30/0269* (2013.01); *G06Q 30/0273* (2013.01); *G06Q 30/0277* (2013.01); *G06Q 30/0253* (2013.01)

(58) Field of Classification Search
None
See application file for complete search history.

(56) References Cited

U.S. PATENT DOCUMENTS

| | | | | |
|---|---|---|---|---|
| 8,145,633 | B1* | 3/2012 | Manolis | G06Q 30/0627 |
| | | | | 705/26.63 |
| 2009/0248513 | A1* | 10/2009 | Aggarwal | G06Q 30/0276 |
| | | | | 705/37 |
| 2012/0004981 | A1* | 1/2012 | Bhatia | G06Q 30/02 |
| | | | | 705/14.42 |

(Continued)

OTHER PUBLICATIONS

Manku et al., "Detecting near-duplicates for web crawling." In Proceedings of the 16th international conference on World Wide Web (WWW '07). Association for Computing Machinery, New York, NY, USA, 141-150 (2007). (Year: 2007).*

*Primary Examiner* — Christopher B Tokarczyk
(74) *Attorney, Agent, or Firm* — Baker Botts L.L.P.

(57) ABSTRACT

Disclosed herein are a method and system that utilize a programmed content predictor to dynamically select electronic publishing content. In particular, the content predictor applies a selection model to select content for one or more selected webpages presented during an electronic transaction. The selection model utilizes a set of one or more machine learning models to select content based on calculated quality scores. The nature of the quality scores determined by the quality score model depend on the particular application. The predictor generates and populates a permutation quality table based on a set of selected content items and page variant, wherein the page variant defines locations of content positions within a webpage. The predictor then consumes the selection model to select a best permutation of content item-content position combinations to be returned for display on a webpage.

19 Claims, 10 Drawing Sheets

(56) References Cited

U.S. PATENT DOCUMENTS

| | | | |
|---|---|---|---|
| 2012/0303765 A1* | 11/2012 | Rajkumar | G06F 16/972 |
| | | | 709/219 |
| 2013/0325585 A1* | 12/2013 | Amit | G06Q 30/0241 |
| | | | 705/14.66 |
| 2014/0040008 A1* | 2/2014 | Belani | G06Q 30/02 |
| | | | 705/14.41 |
| 2014/0075336 A1* | 3/2014 | Curtis | H04L 41/22 |
| | | | 715/753 |
| 2016/0124839 A1* | 5/2016 | Mordo | G06F 11/3664 |
| | | | 717/124 |

* cited by examiner

|  |  | Creative A | Creative B | Creative C | Creative D | Creative ... |
|---|---|---|---|---|---|---|
| Placement 1 | Slot 1 | 0.5 | 0.6 | 0.45 | 0.15 | ... |
| Placement 1 | Slot 2 | 0.45 | 0.7 | 0.3 | 0.5 | ... |
| Placement 2 | Slot 1 | 0.6 | 0.4 | 0.2 | 0.3 | ... |
| ... | ... | ... | ... | ... | ... |  |

MACHINE LEARNING-BASED CONTENT PREDICTOR

TECHNICAL FIELD

The present disclosure relates to a programmed content predictor for dynamically selecting electronic publishing content. In particular, the programmed content predictor utilizes a set of machine learning models to select electronic publishing content.

BACKGROUND

Electronic commerce, commonly known and referred to as e-commerce, relates generally to commercial transactions performed using communications networks, such as the Internet. The commercial transactions may be referred to as electronic transactions and typically relate to one of: online retailing, electronic markets, and online auctions.

A number of different technologies may be utilized to complete an e-commerce transaction, depending on the nature of the transaction and the computing devices utilized by the different parties involved in the transaction. For example, a vendor may utilize a web page of the World Wide Web to promote goods and services for sale. The web page may be connected to an inventory management system that presents information indicating the number of items available at various store locations. The server hosting the web page may also incorporate or otherwise be associated with a check-out system for managing items placed by a browsing user into a virtual cart, as well as a payment gateway for effecting electronic funds transfer from the user in order to complete a purchase order relating to the goods in the virtual cart.

An online transaction typically involves presenting a series of webpages to a computing device accessed by a customer. The customer may initially browse one or more webpages before selecting an item to purchase. Once the customer has decided to purchase the selected item, the customer may navigate a number of successive webpages relating to confirmation of the selected item, options to purchase additional items, payment details, and final confirmation of purchase.

Online retailers and service providers seek to add value during an electronic transaction to increase the value of the consumer. The value of the consumer is not limited to an amount spent during a single transaction. Rather, the value of the consumer depends on the revenue of the current transaction and the margin of that transaction, as well as the life-time value of other actions performed by that consumer. Such other actions may include, for example, signing up to a loyalty program, downloading an associated software application, and the like.

One approach is to deliver contextually relevant material to consumers in order to secure online sales, wherein the contextually relevant material may be directed to brands or products likely to be of interest to the consumer. However, existing approaches have limited context for the user browsing a website. Consequently, the website often displays content that may have little or no relevance to the browsing user.

An online retailer or service provider may have access to many different content items that can be displayed during an online transaction. However, a difficulty exists in how to select, automatically in real-time or near real-time, which content items to present on which webpages. A further difficulty exists in determining locations within a webpage in which to position selected content items, when each page has multiple locations within which content may be displayed. A further difficulty exists in ensuring that selected content items are not duplicated for display across multiple webpages during a single electronic transaction.

Thus, a need exists to provide a content predictor for dynamically selecting electronic publishing content.

SUMMARY

The present disclosure relates to a programmed content predictor for dynamically selecting electronic publishing content to be displayed on at least one webpage during an electronic transaction. The content predictor utilizes a set of machine learning models to select content dynamically in real-time or near real-time, based on at least one selection model.

A first aspect of the present disclosure provides a computer-implemented electronic publishing content selection system comprising:
  a widget encoded on a webpage displayed on a user computing device, said widget configured to:
    send a widget request for content to be displayed on said webpage, and
    display content on said webpage based on a received selector response;
  a selector coupled to a customer data platform for receiving customer information, wherein, on receipt of a widget request, said selector sends a predictor request based on said customer information and a set of available content items;
  a predictor configured, on receipt of said predictor request, to:
    select a page variant, the page variant defining a number of content placements, each content placement having a number of content positions;
    build a permutation quality table for said webpage, based on:
      (i) said selected page variant; and
      (ii) said set of available content items;
      wherein said each entry in the permutation quality table corresponds to a unique content position-content item combination;
    populate each entry in said permutation quality table with a quality score determined by a quality score machine learning model; and
    determine a page score for each permutation of content position-content item combinations, based on said quality scores;
    select a permutation of content position-content item combinations having a highest page score; and
    send a predictor response to said selector indicating which content items are to be displayed in the respective content positions of the webpage, based on the selected permutation having the highest page score;
  wherein on receipt of said predictor response, said selector module forwards a selector response to said widget indicating the content items to be displayed in the respective content positions of the webpage.

A second aspect of the present disclosure provides a machine learning-based content predictor system comprising:
  a machine learning quality score model for determining a quality score for content items;
  a predictor configured to:
    build a permutation quality table based on:

(i) a selected page variant, wherein said page variant defines a number of content placements, each content placement having a number of content positions; and (ii) a set of available content items;

wherein said each entry in the permutation quality table corresponds to a unique content position-content item combination;

consume said quality score model to generate a quality score for each of said content items; and populate each entry in said permutation quality table with said quality scores determined by said quality score machine learning model;

wherein said predictor includes:

a ranking engine configured to:

determine a page score for each permutation of content position-content item combinations, based on said quality scores;

select a permutation of content position-content item combinations having a highest page score; and further wherein said predictor outputs said selected permutation of content position-content item combinations having a highest page score for display on a webpage.

According to another aspect, the present disclosure provides an apparatus for implementing any one of the aforementioned methods.

According to another aspect, the present disclosure provides a computer program product including a computer readable medium having recorded thereon a computer program that when executed on a processor of a computer implements any one of the methods described above.

Other aspects of the present disclosure are also provided.

BRIEF DESCRIPTION OF THE DRAWINGS

One or more embodiments of the present disclosure will now be described by way of specific example(s) with reference to the accompanying drawings, in which:

FIG. 6 is a schematic representation of a permutation quality table comprising each combination of creative content and content position for a webpage, based on an associated page archetype defining content positions;

Method steps or features in the accompanying drawings that have the same reference numerals are to be considered to have the same function(s) or operation(s), unless the contrary intention is expressed or implied.

DETAILED DESCRIPTION

The present disclosure provides a method and system that utilize a programmed content predictor to dynamically select electronic publishing content. In particular, the content predictor applies a selection model to select content for one or more selected webpages presented during an electronic transaction.

The selection model utilizes a set of one or more machine learning models to select content based on calculated quality scores. The set of machine learning models may collectively be referred to as a quality score model. The nature of the quality scores determined by the quality score model depend on the particular application. For example, the quality score may relate to one or more of content quality, relevancy, relative age, revenue, cost, size, click through rates, conversion rates, exit rates, bid prices, and the like.

The method and system define page archetypes for each of the selected webpages. The method and system also define a set of page variants, wherein each page variant defines a number of content locations available on each webpage, with each content location defining an associated set of one or more content positions within that content location. The content predictor selects a page variant for a selected webpage and then selects content for each content position on the selected page variant by utilizing a machine learning quality score model to rank a set of available content items across all content locations and content positions.

By utilizing a content predictor in collaboration with a set of defined page archetypes and page variants, the method and system of the present disclosure are able to select dynamically and serve in real-time, or near real-time, prioritised content to appear in the different content positions of webpages. The content predictor utilizes a set of machine learning models powered by historical data in order to select the content items for the respective content locations, ranking each available content item for each available content position. The content predictor then calculates an overall score for a webpage based on the relative quality scores of placing each available content item in each available content position.

Figure 1:
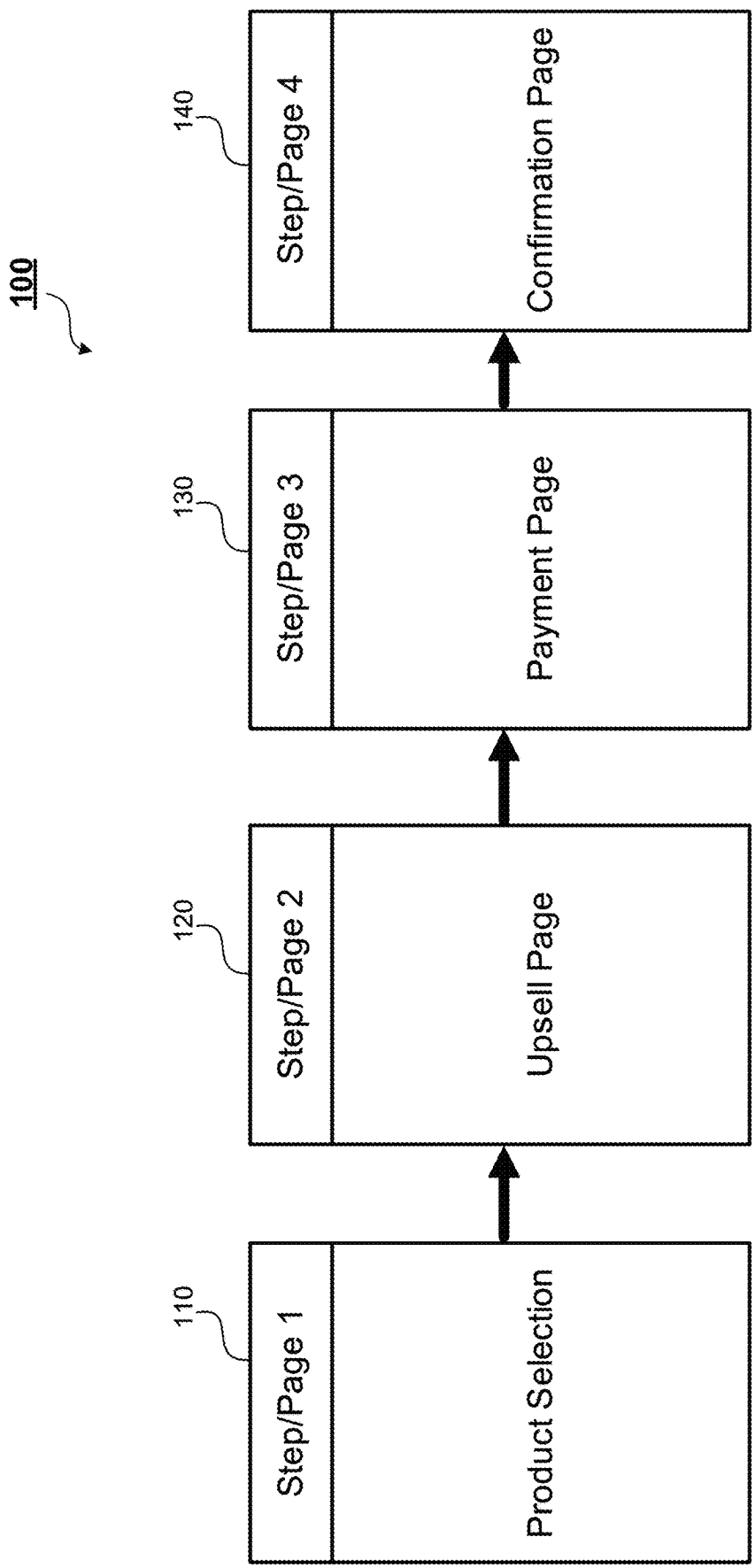
FIG. 1 is a flow diagram illustrating steps of an electronic transaction.

FIG. 1 is a flow diagram that illustrates an electronic transaction 100. A customer selects a product to purchase from a first webpage 110 displayed by an online retailer. Once the customer selects the product, the online retailer displays a second page 120 that includes further content that might be attractive to the customer, resulting in an upsell. The online retailer then presents a payment page 130 to the customer, typically involving a payment gateway to receive payment details from the customer. Such payment details may include, for example, credit card details or a login to an external payment gateway, such as PayPal. In order to finalise the transaction, the online retailer then displays a confirmation page 140 to the customer, enabling the customer to verify that the selected purchase and payment details are correct.

In the context of FIG. 1, any one of the webpages presented in steps 110, 120, 130, 140 may be associated with a page archetype. In one example, the upsell page presented in step 120 is associated with a page archetype "Upsell Page" and the confirmation page presented in step 140 is associated with page archetype "Confirmation Page". Defining a set of page archetypes enables the content predictor to apply a similar treatment in order to select content items for similar types of pages, associated with the same page archetype, that might be displayed by different e-commerce sites and/or across different technical platforms (e.g., web apps, desktops, smartphones, Android, iOS, etc.).

Figure 2:
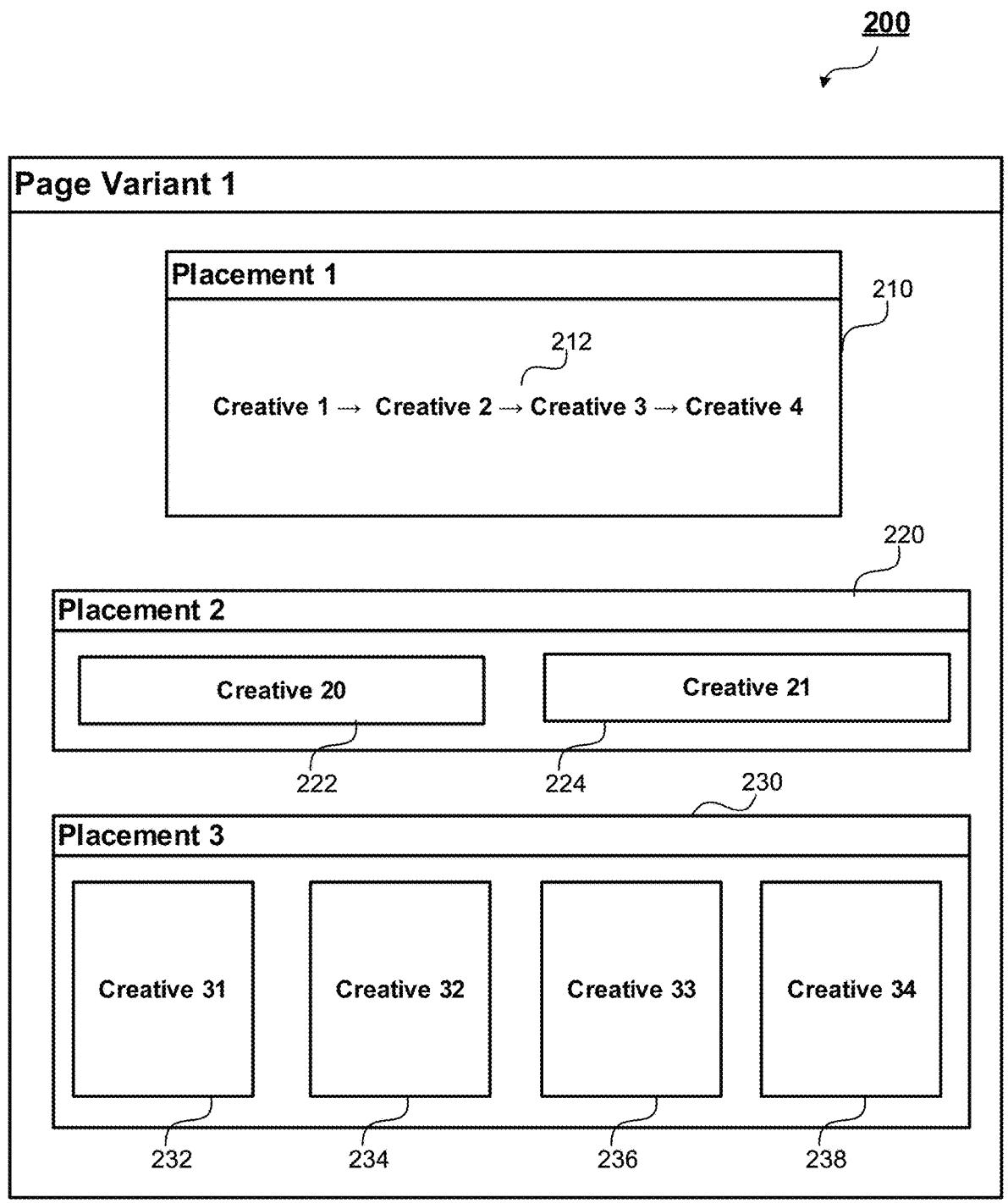
FIG. 2 is a schematic block diagram representation of a page archetype having a number of content locations, each content location having a number of content positions.

FIG. 2 is a schematic block diagram representation of a page variant 200, titled Page Variant 1, for a webpage to be displayed during an electronic transaction. The page variant 200 may be utilized by the content predictor system of the present disclosure to populate one or more of the product selection page 110, the upsell page 120, the payment page 130, or confirmation page 140 of the electronic transaction 100 of FIG. 1.

The page variant 200 includes a number of content locations 210, 220, 230. Each content location (also referred to as a "placement") has an associated number of content positions (also referred to as "slots"). For example, a first content location 210 includes a dynamic position 212, such as a widget for displaying a rotating set of content items. In the example of FIG. 2, the rotating set of content items includes Creative 1, Creative 2, Creative 3, and Creative 4. The content items may be, for example, articles, still images, videos, advertisements, logos, or the like.

A second content location 220 includes two associated positions 222 and 224. Creative 20 is displayed in position 222 and Creative 21 is displayed in position 224. A third content location 230 includes four positions 232, 234, 236, and 238, occupied by Creative 31, Creative 32, Creative 33, and Creative 34, respectively.

Different content locations may correspond, for example, to different content formats, such as lightbox placements, overlay placements, embedded placements, card offer layouts, or checkbox offer layouts. Depending on the implementation, each content item in an available inventory may be eligible to be displayed in multiple content positions.

Different page variants may have different numbers of content locations located in different regions of a webpage. Each of the content locations may have a different number of associated positions, with the positions arranged in a way that may be particular to that page variant. Defining a set of different page variants to be utilized in association with different page archetypes associated with webpages provides a technical framework by which to present content in a desired manner. As indicated above, content items may take many different forms and different forms may be more visually attractive or better suited to display in certain regions of a webpage, depending on where that webpage occurs during an electronic transaction, characteristics of the e-commerce provider, and the type of platform on which the webpage is being displayed.

In some embodiments, each content position has a corresponding minimum quality score (minQS) that is applied by the predictor as a threshold to eliminate low ranking content items, wherein the predictor utilizes a quality score model first to determine a quality score for each content item-content position combination. In some embodiments, the minQS is the same for all of the content positions.

Whilst it may appear that a content position within a content location positioned at the top of a webpage may be the most desirable, particularly in relation to advertising content, this is not necessarily the case. The content predictor method and system of the present disclosure have particular application to serving prioritised content items to a set of webpages during an electronic transaction, such that the content displayed across a webpage is maximized in relation to at least one attribute.

The predictor serves content to a display of a user computing device in a dynamic manner during an electronic transaction performed on an e-commerce website associated with an e-commerce server. A user utilizes the user computing device to view the e-commerce website, browse among the goods on offer, and select goods for purchase. While examples and embodiments may describe goods being offered by an e-commerce website, it will be appreciated that the goods may be products or services and that the term "goods" is used in this specification for the sake of clarity.

The transaction system utilizes a combination of a software widget encoded within a webpage of the e-commerce website, a software development kit (SDK), and application programming interface (API) to enable the e-commerce website to interact with a content provisioning platform and inventory provider to deliver content in a dynamic manner during electronic transactions.

A widget is an element of a graphical user interface (GUI) that displays information or provides a predefined manner by which a user is able to interact with an application or website. Widgets may take a number of forms that include, but are not limited to, buttons, pull-down menus, selection boxes, progress indicators, on-off checkmarks, scroll bars, windows, window resizing tools, toggle buttons, and the like for displaying information and for inviting, accepting, and responding to user inputs.

The content provisioning platform stores a set of available inventory, and/or derives available inventory from one or more inventory providers during an electronic transaction being performed on an e-commerce website, and selects content for display on the e-commerce website. Selection of the content is performed by a selection engine of the content provisioning platform. Depending on the circumstance, the selection engine selects content based on at least one context attribute associated with the electronic transaction, consumer attributes associated with the user performing the electronic transaction, and a predefined set of rules associated with the electronic transaction.

Further, a content predictor within the selection engine may be utilized to select content based on an overall score resulting from populating all content positions within a webpage with different content items, wherein the overall score is based on attributes associated with the respective content items. The attributes associated with each of the respective content items may be utilized by one or more machine learning models to generate individual quality scores associated with the respective content items.

In some embodiments, the content provisioning platform selects content based on available inventory. In the context of this application, inventory refers to any goods (i.e., products or services) that may be offered to a consumer during an electronic transaction. Inventory is to be construed broadly and is not restricted to tangible goods that are physically in stock. Inventory available for an electronic transaction is made available by one or more inventory providers, the content provisioning platform, or a combination thereof.

Available inventory may include, but is not limited to, offers relating to further goods, actions relating to the electronic transaction, and the like. A content item to be displayed may relate to any of the available inventory. Actions relating to the electronic transaction may include, for example, printing, emailing, or texting a copy of a receipt. In an example in which the electronic transaction relates to purchasing concert tickets, available inventory may include printing, emailing, or texting copies of the purchased concert tickets. Further actions relating to the electronic transaction may include, for example, reminders to be sent regarding further goods. For example, a further action relating to an electronic transaction may be an option to have a reminder sent by email, text, or in-app notification in relation to goods offered by one or more inventory providers. In the scenario described above in which the electronic transaction relates to purchasing concert tickets, available inventory may include an option for the consumer to have an email reminder sent a predefined period of time before the concert is to take place, wherein the email reminder relates to parking, merchandise, or other goods.

Selection of content may relate not only to available inventory, but optionally also to the creatives and user experience associated with the available inventory. That is, selection of the content optionally includes determination of characteristics of how the selected inventory is to be displayed to the user, such as the type of widget, the look and feel, size, and orientation of the contextual content region, and the language and creative text and graphics used to convey the selected inventory.

Figure 3:
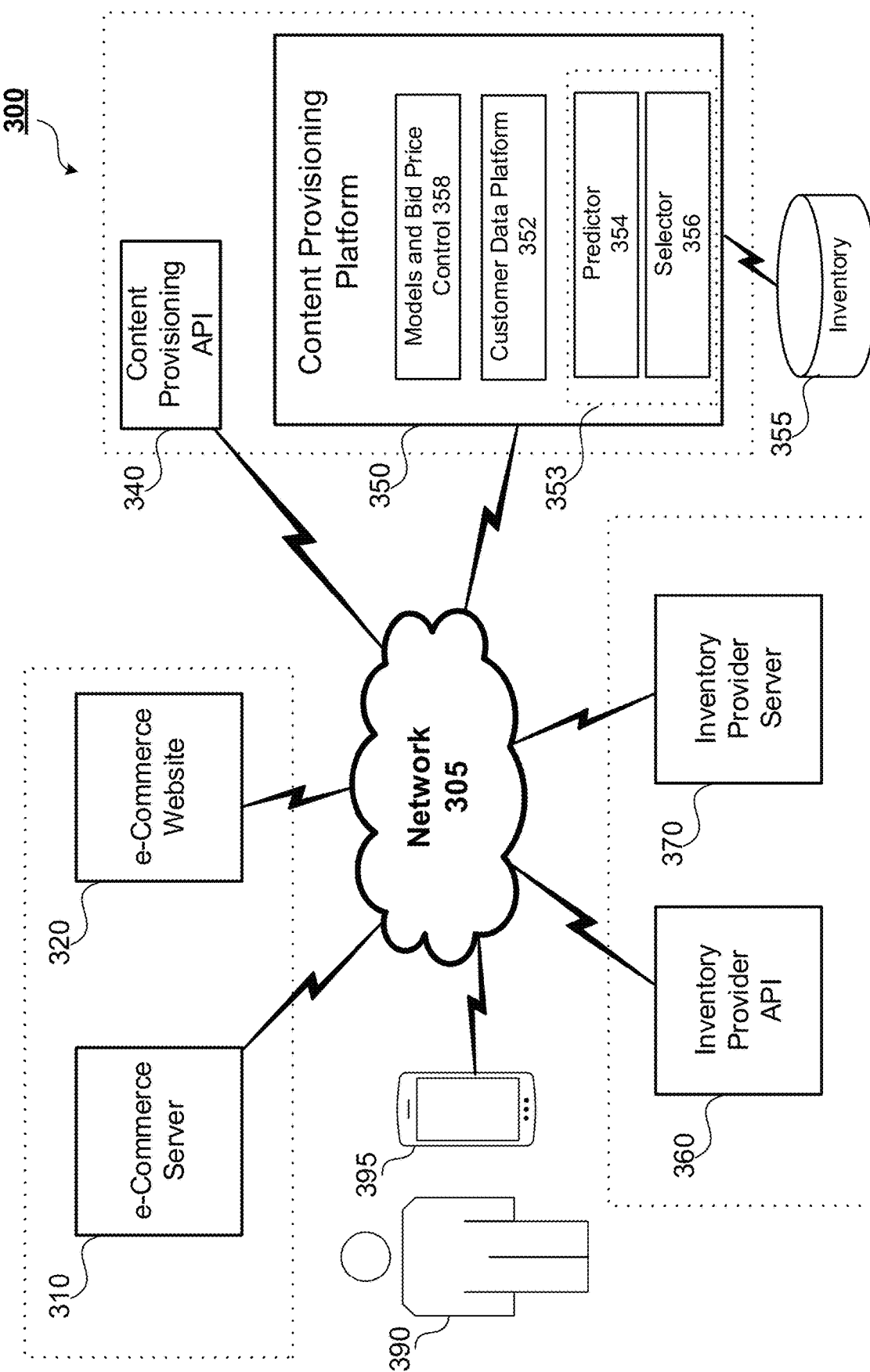
FIG. 3 is a schematic block diagram representation of an e-commerce transaction system.

FIG. 3 is a schematic block diagram representation of an e-commerce transaction system 300. The system 300 includes an e-commerce server 310 that is coupled to a communications network 305. The communications network 305 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The e-commerce server 310 is a host server that offers products for sale via an associated e-commerce website 320. It will be appreciated that the e-commerce website 320 may be hosted on the e-commerce server 310 or on a separate web-hosting service.

The system 300 also includes a content provisioning platform 350 that is coupled to the communications network 305. The content provisioning platform 350 is configured to select inventory to be provided dynamically for display on the e-commerce website 320 during an electronic transaction.

Due to the interaction between the content provisioning platform 350 and the e-commerce server 310, the e-commerce server 310 may also be referred to as a partner server 310 and the associated e-commerce website 320 may be referred to as a partner website 320.

Inventory may be sourced beforehand and stored in a local inventory database 355. Alternatively, or in combination with locally stored inventory, inventory may be sourced during the transaction, for example, based on contextual information associated with that electronic transaction. The contextual information depends on the implementation and may include, for example, but is not limited to, consumer attributes, context attributes, or a combination thereof. Consumer attributes are attributes associated with a consumer that are affecting the transaction and may include, for example, age, sex, geographical location, computing device type, browser type, and the like. Context attributes may include, for example, product type, purchase date, purchase time, product location, and the like.

During an electronic transaction, inventory is selected by a content predictor 354, which is a programmed engine that utilizes a machine learning quality score model to determine a score for a webpage, based on a page variant associated with that webpage and all available inventory.

The content provisioning platform 350 has an associated content provisioning API 340. Depending on the implementation, the content provisioning API 340 may be integral with or co-located on the content provisioning platform 350. Alternatively, as shown in FIG. 3, the content provisioning API 340 is hosted separately from the content provisioning platform 350, such as on Amazon Web Services (AWS), Google Cloud Platform, or similar hosting platform. In one implementation, the content provisioning API 340 is hosted on AWS with multi-region deployment to provide greatest uptime and availability for the content provisioning API 340. The content provisioning platform 350 exchanges data with the content provisioning API 340 via the communications network 105.

In the example of FIG. 3, the content provisioning platform 350 is coupled to the local inventory database 355. The local inventory database 355 stores information about local inventory that may be provided by the content provisioning platform 350 during an electronic transaction performed using the e-commerce server 310.

The system 300 further includes an inventory provider server 370 and an associated inventory provider API 360, which may be hosted on the inventory provider server 370 or, as shown in FIG. 3, hosted separately. The inventory provider API 360 and inventory provider server 370 exchange data via the communications network 305. The inventory provider server 370 optionally provides inventory for the content provisioning platform 350 to provide to the e-commerce server 310. Inventory provided by the inventory provider server 370 are additional goods that may be offered for sale to a user 390 making an electronic transaction via a user computing device 395, such as parking for a concert venue, ticket insurance, merchandise, and the like.

The content provisioning platform 350 includes a customer data platform (CDP) 352, a predictor module 354, a selector module 356, and a models and bid price control module 358. The CDP 352 stores customer attributes gathered from customer registrations, third-party websites, and transactions made using the e-commerce server 310 and e-commerce website 320.

The predictor module 354 and selector module 356 together form a content selection engine 353 that determines what content is to be presented during an electronic transaction. The models and bid price control module 358 provides a set of models, which may collectively be referred to as a quality score model. The set of models are utilized by the predictor module 354 to select which content items are to be displayed in content positions defined by a page variant selected for a webpage to be displayed to the user computing device 395.

The content provisioning platform 350 may include a content rendering module (not shown) that formats the way in which selected inventory is to be presented, as contextually relevant content, on a webpage of the e-commerce website 320. In some embodiments, the content rendering module stores data that determines how content is to be rendered on the e-commerce website 320. Such data may include, for example, but is not limited to, campaign meta data, creatives, UX formats, UX designs, and the like. Depending on the particular implementation and application, the content rendering module may store data relating to a number of different options (e.g., layouts A, B, C; creatives X, Y,Z) from which the selector module 353 can choose. In some embodiments, the stored data includes default text, images, audio content, or any combination thereof, that is to be presented in association with the selected inventory.

The user 390 utilizes the computing device 395 coupled to the communications network 305 to interact with the e-commerce website 320. The computing device 395 shown in the example of FIG. 3 is a smartphone, but may equally be implemented using a personal computer, tablet computing device, phablet, or the like. The user 390 utilizes one or more input devices on the computing device 395, such as a keyboard, mouse, or touchscreen, to navigate pages of the e-commerce website 320. The user 390 is thus able to view goods offered for sale by the e-commerce server 310 via the e-commerce website 320.

In this example, the goods offered for sale by the e-commerce server 310 are concert tickets. The user 390 browses a selection of concert tickets offered for sale on the e-commerce website 320, selects a set of concert tickets to purchase, and adds the selected concert tickets to a virtual shopping cart. When the user 390 decides to complete the purchase of the selected concert tickets, the user 390 activates a "Checkout" button and the e-commerce website 320 notifies the e-commerce server 310 that the user 390 wants to proceed to the checkout and complete the purchase of the selected concert tickets. With reference to FIG. 1, the selection of the tickets corresponds to the product selection page 110.

Once the user 390 has selected tickets to purchase, the e-commerce website presents to the user computing device 395 an upsell page 120. The upsell page is associated with a predefined page archetype "Upsell Page". The predictor module 354 utilizes the page archetype to select a page variant that defines a number of content locations to be displayed within the upsell page 120, wherein each content location is associated with a number of content positions.

Figure 4:
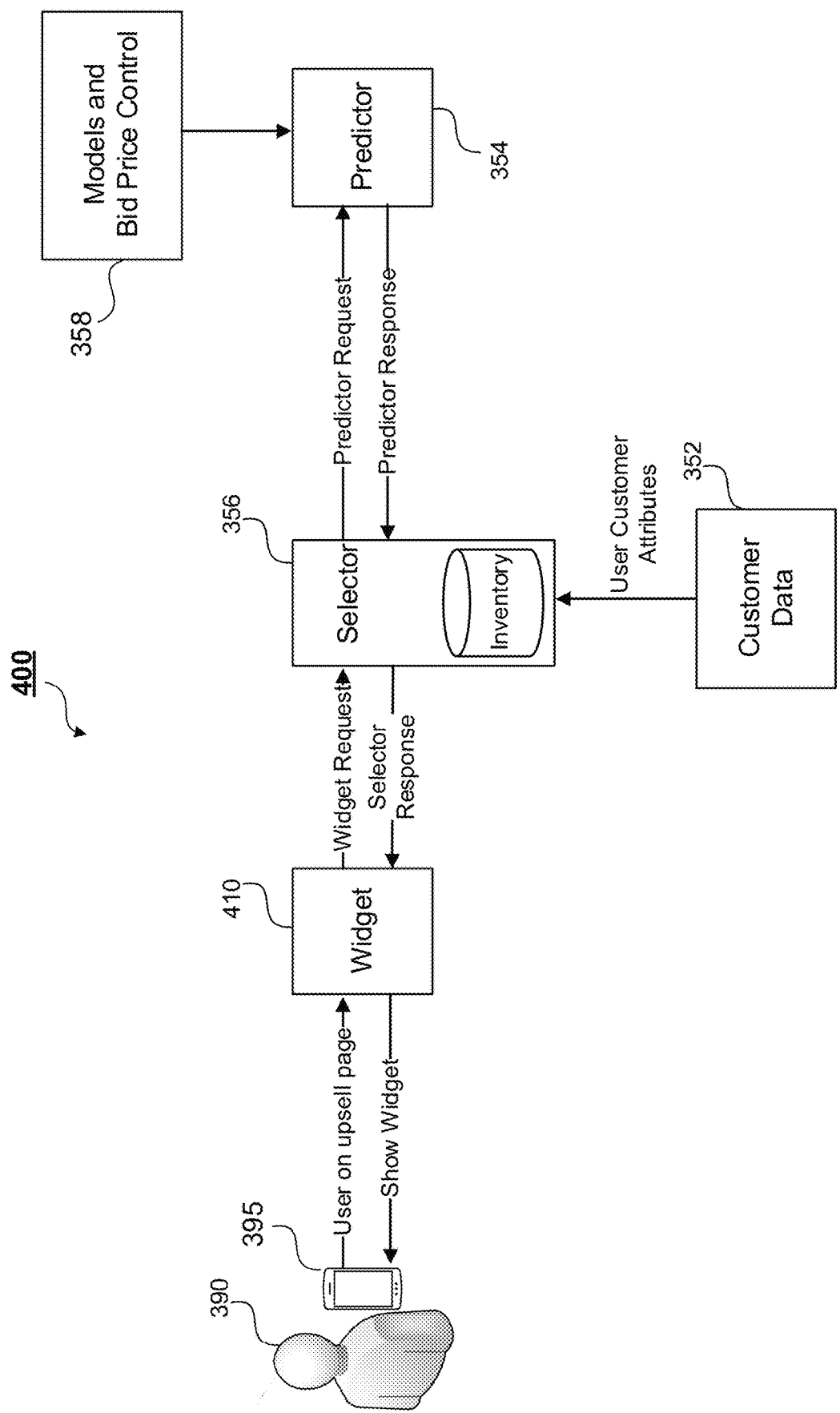
FIG. 4 illustrates a method of utilizing a predictor module to select content to an upsell page.

FIG. 4 illustrates a method 400 of providing content to the upsell page, based on the predictor module 354 selecting content for all content positions on the upsell page as a result of an overall score determined for all permutations associated with available content. Whilst the method 400 is described in relation to an upsell page, the method 400 may equally be utilized in relation to any other webpage displayed during an e-commerce transaction.

The method 400 shows the user 390 on an upsell page displayed by the e-commerce website 320. A widget 410 encoded within the upsell page 120 sends a widget request to the selector module 356. The widget request asks the selector module 356 to provide content to populate the content positions on the upsell page. The widget request may include the page archetype associated with the webpage to be displayed, which in this case is the upsell page having an associated page archetype of "Upsell Page".

The selector module 356, on receipt of the widget request, makes a predictor request to the predictor module 354. The predictor request includes a set of request information relating to the transaction, which may be received from the widget 410 and/or the Content Provisioning API 340. For example, the request information may include one or more of: user context (e.g., age, gender, device type, hour of day, etc.), partner context (e.g., partner identifier, credit card type, purchased product category, etc.), eligible page variants, eligible creatives for each placement and position (including maximum bid price, account currency, and all eligible content positions), and business rules.

The user context information is sourced from the customer data platform 352. Eligible creatives are selected from the local inventory database 355 or by dynamically activating the content provisioning API 340 to request inventory from the inventory provider server 370, via the inventory provider API 360. In some circumstances, each content item (i.e., creative) is associated with a platform or other attributes that influence whether that content item is suitable for a given widget request. Business rules may relate, for example, to restricting the display of content items during different transactions, perhaps due to the nature of those content items, or to restricting the number of content items that may be displayed from a particular content provider. Business rules may be stored in the selector module 356 or storage (not shown) associated with the content provisioning platform 350.

The predictor module 354 receives the predictor request from the selector module 356. The predictor module 354 accesses a set of models from the models and bid price control module 358 that the predictor module 354 utilizes in conjunction with the eligible inventory information to select, from a predefined set of page variants, a page variant for the webpage, and to rank and ultimately select content to be displayed in each of the content positions on the upsell page.

Once the predictor module 354 has selected content for all of the content positions for the upsell page, based on the page archetype associated with the upsell page, the predictor module 354 sends a predictor response to the selector module 356. The predictor response includes a selected page variant, as well as selected content items and their respective content positions. The predictor response also includes a score associated with each selected content item, and a payment price associated with each selected content item.

The selector module 356 then sends a selector response to the widget 410, wherein the selector response indicates what selected content is to be displayed in the respective content positions of the upsell page. The widget 410 then displays the selected content in the respective positions.

Depending on the implementation and application, widgets encoded in one or more of the webpages displayed during an electronic transaction trigger the selector module 356 to send a predictor request to the predictor module 354 to ensure that an optimised page variant is displayed for those webpages.

Figure 5:
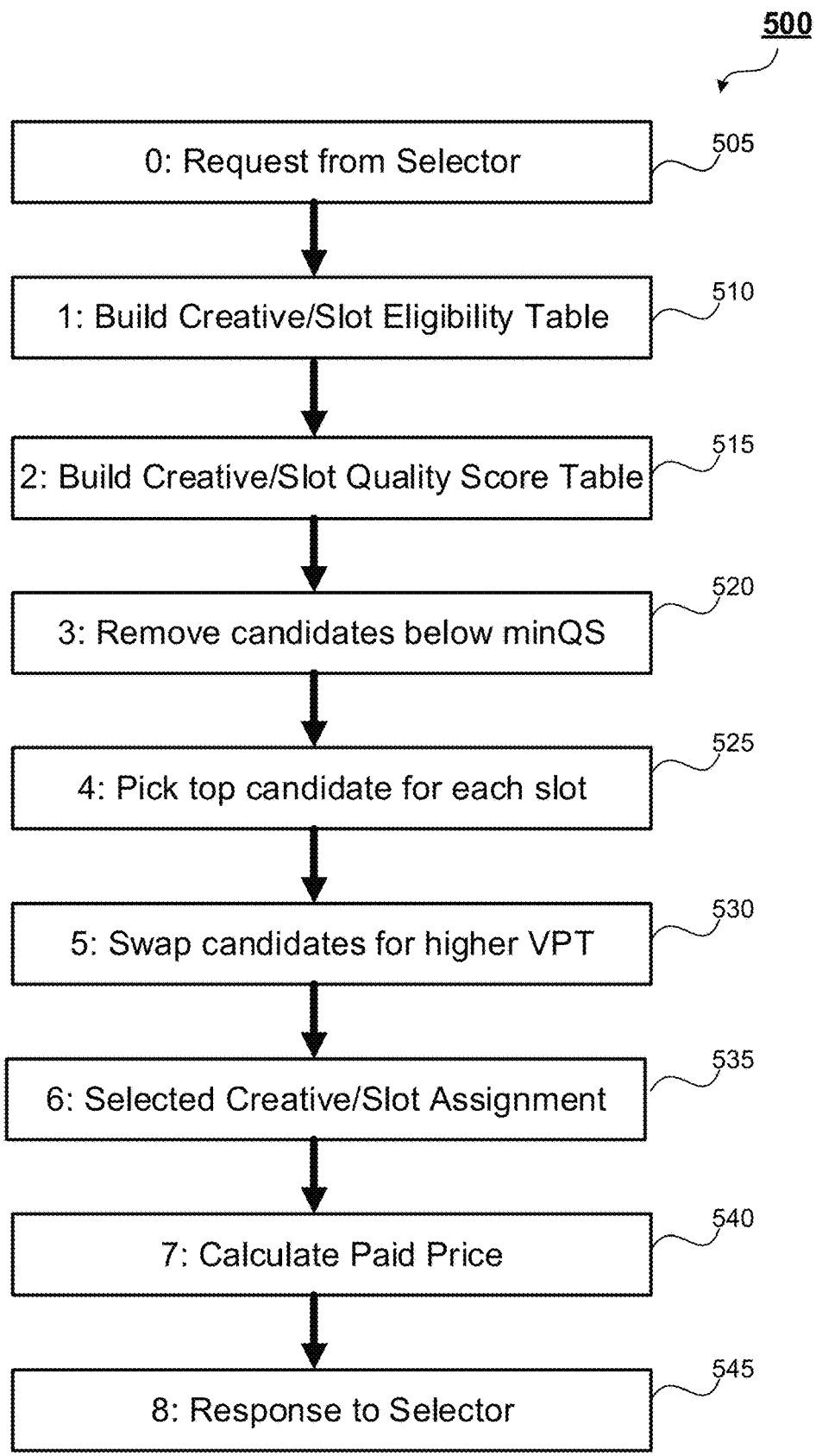
FIG. 5 is a flow diagram illustrating a content selection method utilized by a predictor module.

FIG. 5 is a flow diagram illustrating a content selection method 500 utilized by the predictor module 354 to select content to be presented to a webpage having an associated page archetype for which the predictor module 354 has selected a page variant. The method 500 begins at step 505, in which the predictor module 354 receives a predictor request from the selector module 354. In step 510, the predictor module 354 selects a page variant and utilizes a set of available inventory forwarded from the selector module 356 to create a permutation table based on all of the available inventory (e.g., creative content) and all of the available content positions defined by the page archetype. The predictor module 354 utilizes a page variant selection model to select the page variant, from a set of page variants, to be utilized in relation to the webpage for which a predictor request has been received. The page variant selection model selects the page variant based on one or more of a page archetype associated with a webpage for which a predictor request has been received, historical data associated with different page variants, historical data associated with different page archetypes, and the like.

In step 515, the predictor module 354 generates a permutation quality table based on one or more models, wherein the models assign a value to each of the available creative content for each position. The models assign values by applying machine learning models to historical data relating to the content items. Such historical data may relate, for example, to the click through rates (CTR), bid prices, exit rates, and the like. Suitable machine learning models include, for example, but are not limited to, linear regression, neural networks, and lightGBM.

FIG. 6 is an example of a permutation quality table 600. In the example of FIG. 6, each row in the permutation quality table 600 corresponds to a content position. The first three rows displayed are:

Placement 1, Slot 1, corresponding to a first content position (i.e., slot) in a first content location (i.e., placement) within a webpage;

Placement 1, Slot 2, corresponding to a second content position (i.e., slot) in a first content location (i.e., placement) within a webpage; and Placement 2, Slot 1, corresponding to a first content position (i.e., slot) in a second content location (i.e., placement) within a webpage.

Each column in the permutation quality table 600 corresponds to an available creative content. The first four rows displayed are Creative A, Creative B, Creative C, and Creative D. As can be seen from the table 600, any number of rows can be accommodated, corresponding to the number of content provisions for a particular webpage. Similarly, any number of columns can be utilized, dependent upon the number of available content items.

The predictor module 354 populates each entry in the permutation quality table 600 with a score for each combination of creative content and content position. The predictor module 354 determines each score based on a set of models in the model and bid price module 358. The predictor module 354 may utilize the same model for each different page archetype. Alternatively, the predictor module 354 utilizes different models for each different page archetype. In this way, the predictor module 354 is able to apply different models for different phases or stages of an e-commerce transaction. The predictor module 354 utilizes the selected model or models to calculate a quality score for displaying a particular content item in a particular content position. That is, the quality score may be based on the output of any number of models, depending on the particular application. By calculating a quality score for each combination of content item and content position, the predictor module 354 is able to calculate a page score for each permutation (i.e., page assignment).

Different formulae may be used to calculate the quality scores, depending on the particular application. In one embodiment, the application relates to displaying creative content in each content position, wherein each content item is associated with a bid price for each content position. The bid price is the amount that a party associated with the content item is willing to pay to have the content item displayed in the particular content position of that webpage. In one embodiment, the quality score is determined using the equation:

$$\text{Quality Score} = \text{BidPrice} * \text{CTR} * 0.5 \qquad \text{Eqn}(1),$$

where CTR is the Click Through Rate, which is determined for each content item by a machine learning model based on historical CTR data.

In a second embodiment, the quality score is determined using the equation:

$$\text{Quality Score} = \text{BidPrice} * \text{CTR} \qquad \text{Eqn}(2),$$

Having determined a score for each entry in the table 600, the predictor module 354 is able to determine a score for every possible permutation of positioning different available content in the available content positions for a webpage by summing the scores across all available content positions. In particular, each content item made available to the predictor module is associated with a score and a bid price.

In the example of FIG. 6, the method 600 refines the selection of content by optionally applying a minimum quality score threshold. Thus, in step 520 the predictor module 354 removes all content candidates that have a score below the minimum quality score threshold. In step 525, the predictor module 354 selects a top content item candidate for each available content position. In step 530, the predictor module 354 optionally swaps the content positions for the selected top content item candidates to achieve a predicted higher value per transaction. Swapping content item candidates may be based, for example, on exit rates associated with different item candidates. Exit rates are determined by an exit rate model that applies machine learning machine to historical exit rate data. A content item candidate having a high exit rate may result in the user 390 exiting the transaction early or without further purchase. Such a content item candidate is optionally swapped out in favour of an alternative content item candidate having a lower exit rate, even if the alternative content item has a lower bid price, as the overall revenue associated with the transaction may be predicted to be higher.

Control passes from step 530 to step 535, in which the predictor module 354 identifies the permutation of assigned creative content to content positions having the highest score. In step 540, the predictor module 354 calculates a paid price for each content/position combination and in step 545 the predictor module 354 sends a predictor response to the selector module 356. The predictor response includes the selected page variant, which identifies the number and location of content placements and associated content positions, and the identified permutation of assigned creative content to content positions having the highest score.

Figure 7:
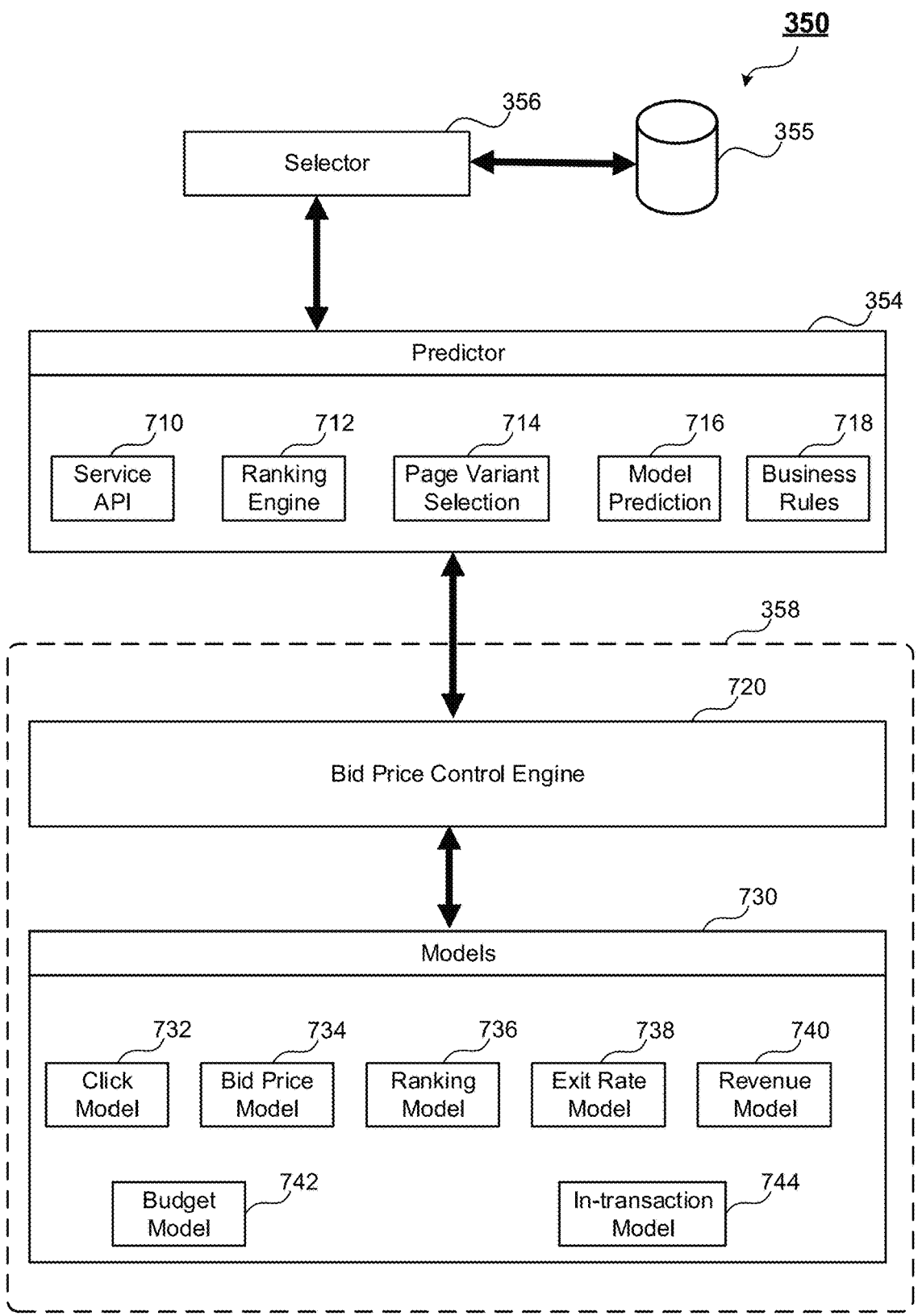
FIG. 7 is a schematic block diagram of a system architecture on which the content predictor may be practised.

FIG. 7 is a schematic block diagram representation of a system architecture providing further detail of the content provisioning platform 350 of FIG. 5. As described above, the selector module 356 accesses locally stored content items from a local inventory database 355. Alternatively, or in combination with locally stored content, the selector module 356 may request content items be provided by calling the content provisioning API 340 to source content items from an inventory service provider 370.

The selector module 356 sends a predictor request to the predictor module 354. The predictor module 354 in the embodiment of FIG. 7 includes a service API 710 for interacting with other modules. The predictor module 354 also includes a ranking engine 712 that ranks content items by utilizing an exit rate model and one or more predefined ranking algorithms. The ranking algorithms utilize one or more parameters, depending on the application. The parameters may include, for example, but are not limited to, quality scores, click through rates, exit rates, bid prices, and the like. The quality scores for each content item may be calculated, for example, using the Eqn 1 and Eqn 2 above.

In one implementation, the ranking engine 712 determines a set of ranking scores for each permutation of content item-content position combinations. This corresponds to step 530 of FIG. 5, in which the positions of the top content items are swapped in order to determine the highest overall score.

In one example, there are three content items Creative 1, Creative 2, and Creative 3 for three possible slots, wherein the three content items correspond to the top candidates for each slot, as selected in step 525 of FIG. 5. The ranking engine 712 calculates a ranking score for each permutation:

$$\text{Ranking Score}_{C1C2C3} = QS1 + (1-Ex1)*QS2 + (1-Ex1)*(1-Ex2)*Q3,$$

$$\text{Ranking Score}_{C1C3C2} = QS1 + (1-Ex1)*QS3 + (1-Ex1)*(1-Ex3)*Q2,$$

$$\text{Ranking Score}_{C2C1C3} = QS2 + (1-Ex2)*QS1 + (1-Ex2)*(1-Ex1)*Q3,$$

$$\text{Ranking Score}_{C2C3C1} = QS2 + (1-Ex2)*QS3 + (1-Ex2)*(1-Ex3)*Q1,$$

$$\text{Ranking Score}_{C3C1C2} = QS3 + (1-Ex3)*QS1 + (1-Ex3)*(1-Ex1)*Q2,$$

$$\text{Ranking Score}_{C3C2C1} = QS3 + (1-Ex3)*QS2 + (1-Ex3)*(1-Ex2)*Q1,$$

where:

$QS1$=quality score for Creative 1

$QS2$=quality score for Creative 2

$QS3$=quality score for Creative 3

$Ex1$=predicted exit rate for Creative 1

$Ex2$=predicted exit rate for Creative 2

$Ex3$=predicted exit rate for Creative 3

The ranking engine 712 then selects the permutation having the highest ranking score.

The predictor module 354 also include a page variant selection engine 714, which selects a page variant, from a set of page variants, to be utilized in relation to a webpage. The page variant selection engine 714 utilizes a revenue model to choose a page variant based on one or more of a page archetype associated with a webpage for which a predictor request has been received, historical data associated with different page variants, historical data associated with different page archetypes, and the like. For example, the revenue model selects a page variant based on past revenue performances of different page variant/page archetype combinations.

The predictor module 354 further includes a model prediction module 716 that determines a click through rate and bid price. The click through rate is determined from a click model 732 and in-transaction model 744. The bid price is determined from a bid price model 734, a ranking model 736, a budget model 742, and control factors generated from a bid price control engine that forms part of the models and bid price control module 358.

The predictor module 354 further optionally includes a set of stored business rules 718 that govern the way in which the predictor module 354. The business rules 718 may, for example, apply one or more filters to the available content based on bid price, click through rates, nature of content, content format, duplication of content, and the like.

As described above in relation to FIGS. 3 and 4, the predictor module 354 interfaces with a models and bid price control module 358. In the architecture of FIG. 7, the models and bid price control module 358 includes a bid price control engine 720 and a models module 730. The bid price control engine 720 controls bid prices associated with content items to achieve a predefined target, such as cost per sale. A content item may be, for example, an advertisement that forms part of an advertising campaign that has one or more campaign metrics, such as a target of number of views, number of clicks, cost per sale, cost per conversion, and the like. In order to regulate the campaign performance in line with the campaign metrics, the bid price control engine 720 lowers or increases the bid price associated with the content item.

The models module 730 includes a set of models that are utilized by the predictor 354 to select content items to be displayed in the respective slots of a selected page variant. As described above in relation to FIG. 5, the models calculate values by applying machine learning models to historical data. The historical data may relate, for example, to the content items, the user, and the e-commerce website. The historical data may relate, for example, to the click through rates (CTR), bid prices, exit rates, conversion rates, sales value, and the like. The models may be constantly improved by feeding back new data to the models. Suitable machine learning models include, for example, but are not limited to, linear regression, neural networks, and lightGBM.

In the example of FIG. 7, the models module 730 includes the click model 732, the bid price model 734, the ranking model 736, the exit rate model 738, the revenue model 740, the budget model 742, and the in-transaction model 744. The click model 732 determines a predicted CTR for each content item that is available for a webpage, based on historical click data and impressions. The bid price model 734 utilizes historical bid price data to modify bid price associated with a content item, based on a target. The bid price model 734 utilizes a model tailored to a content owner's requirements, which may be based for example, on conversion rates, incremental rates, and sales rates.

The ranking model 736 determines a predicted paid price for each content item, based on historical spending data.

The exit rate model 738 utilizes historical exit rate data to determine a predicted exit rate for each content item that is available for the webpage to be displayed. The revenue model 740 selects the page variant based on historical page variant revenue. The budget model 742 controls spending for a content owner based on historical spending data.

Figure 8:
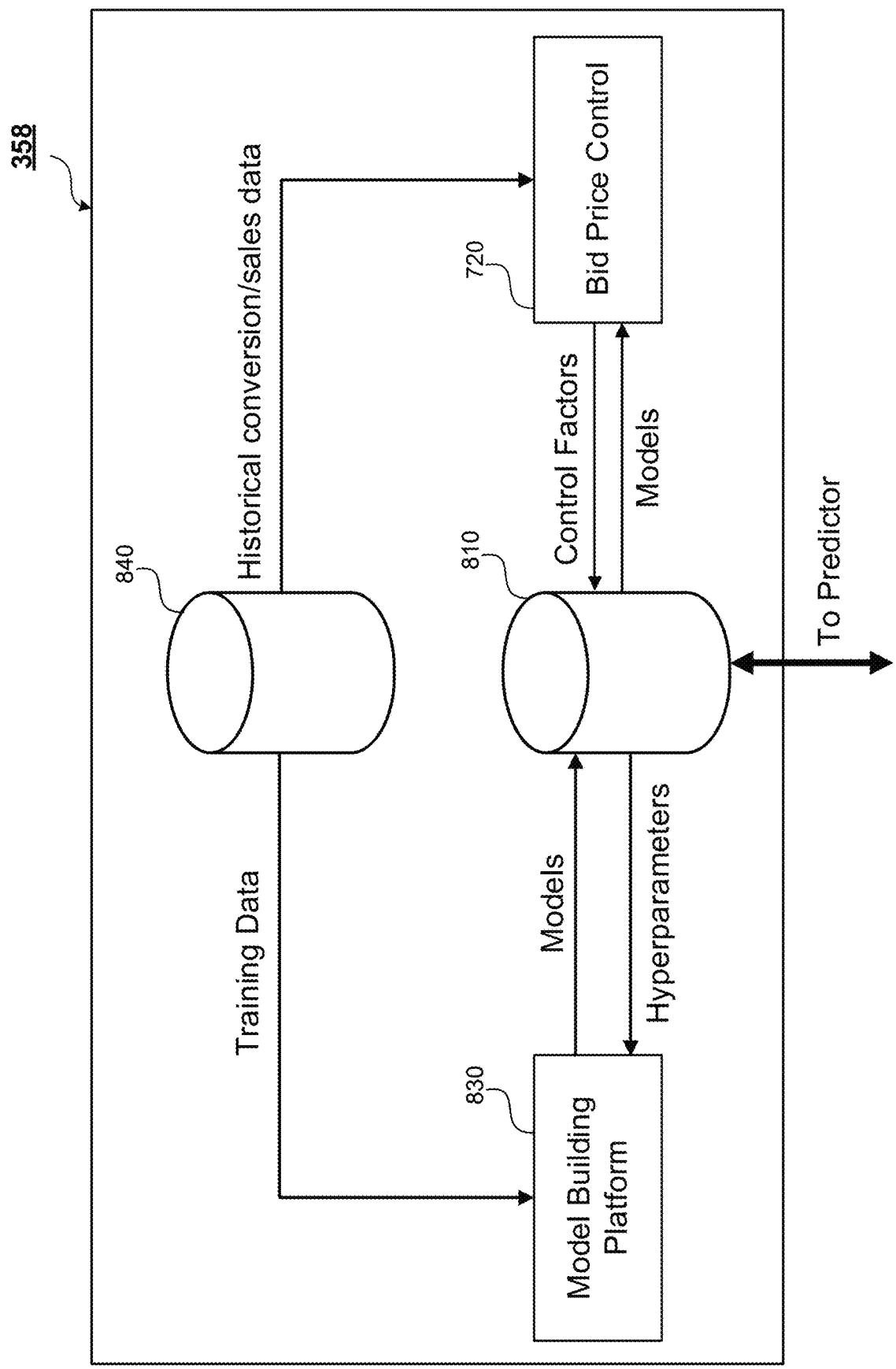
FIG. 8 is a schematic block diagram of a method of utilizing a predictor module.

FIG. 8 illustrates flow of data among the components of the models and bid price control module 358. A model storage device 810 stores data utilized by the models and bid price control module 358. The model storage device 810 may be implemented using one or more local or remote storage devices. In one implementation, the storage device 810 is implemented using Amazon S3 (Amazon Simple Storage Service) coupled to the communications network 305. Other local, remote, or cloud-based storage devices, or a combination thereof, may equally be utilized.

A Model Building Platform 830 is a platform that hosts each of the models shown in FIG. 7. The models hosted on the Model Building Platform 830 receive training data from an historical data storage 840, which may be implemented using one or more storage devices. In one implementation, the historical data storage 840 is implemented using Amazon Redshift. Other local, remote, or cloud-based storage devices, or a combination thereof, may equally be utilized. The Model Building Platform 830 also receives hyperparameters from the model storage device 810. The hyperparameters are determined during an initial tuning of each model and are then used with the training data to train the respective models. For example, when a model is implemented using lightGBM, the hyperparameters may include the number of trees and the number of leaves.

The Model Building Platform 830 stores the models at the model storage device 810 for consumption by the predictor module 354 and the bid price control engine 720.

The historical data storage 840 feeds historical data pertaining to conversions and sales to the bid price control engine 720. The bid price control engine 720 also receives models from the model storage device 810 in order to determine control factors to regulate bid prices to achieve predefined targets. The bid price control engine 720 transmits the determined control factors to the model storage device 810 to be utilized by the predictor module 354.

The content predictor described herein provides a technical solution to select content in a dynamic, real-time or near real-time manner during an electronic transaction, based on a model to optimise the selection of content items for each content position on a webpage.

Figure 9:
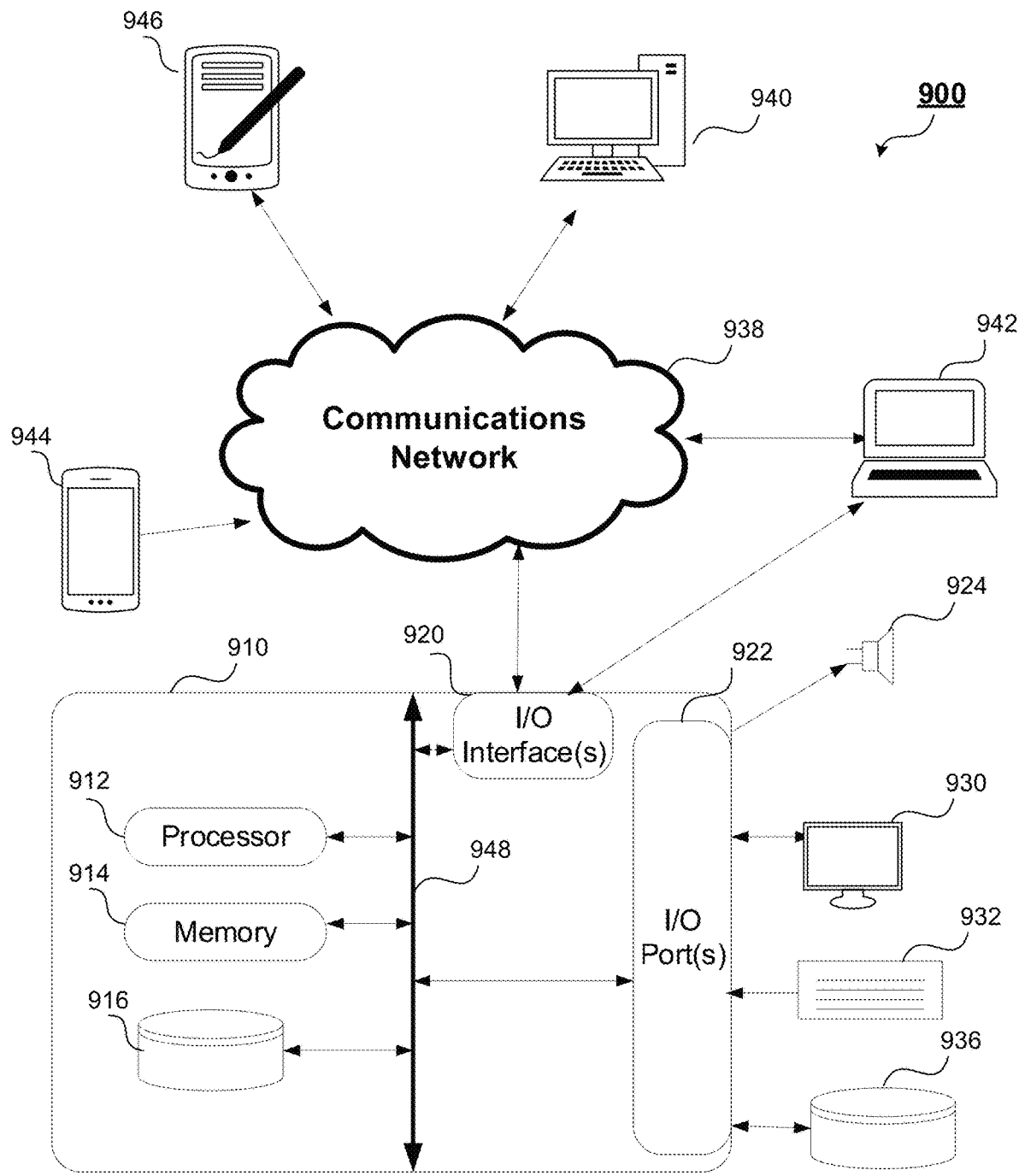
FIG. 9 is a schematic block diagram representation of a system that includes a general-purpose computer on which one or more embodiments of the present disclosure may be practised.

The content predictor system of the present disclosure may be practised using one or more computing devices, such that when implemented in accordance with the present disclosure gives rise to an improved computing system for selecting content for display in a set of content positions located within a webpage, as defined by an associated page archetype. FIG. 9 is a schematic block diagram representation of a system 900 that includes a general-purpose computer 910. The general-purpose computer 910 includes a plurality of components, including: a processor 912, a memory 914, a storage medium 916, input/output (I/O) interfaces 920, and input/output (I/O) ports 922. Components of the general-purpose computer 910 generally communicate with each other using one or more buses 948.

The processor 912 may be implemented using any device or portion of a device that processes electronic data (e.g., from registers and/or memory to transform that electronic data into other electronic data that may be stored in registers and/or memory). The processor 912 may be representative of one or more processors operating individually, sequentially, or in parallel. The processor 912 may execute code to perform inventory selection, including the application of predefined rules and selection of creatives, in order to deliver contextually relevant content during an electronic transaction.

The memory 914 may be implemented using Random Access Memory (RAM), Read Only Memory (ROM), or a combination thereof. The storage medium 916 may be implemented as one or more of a hard disk drive, a solid state "flash" drive, an optical disk drive, or other storage means. The storage medium 916 may be utilized to store one or more computer programs, including an operating system, software applications, and data. In one mode of operation, instructions from one or more computer programs stored in the storage medium 916 are loaded into the memory 914 via the bus 948. Instructions loaded into the memory 914 are then made available via the bus 948 or other means for execution by the processor 912 to implement a mode of operation in accordance with the executed instructions. The memory 914 may also be utilized to store consumer attributes, context attributes, and the set of predefined rules for inventory selection. When the prediction services module 154 is implemented using machine learning, the memory 914 may be utilized to store one or more machine learning models, fixed logic models, or a combination thereof.

One or more peripheral devices may be coupled to the general-purpose computer 910 via the I/O ports 922. In the example of FIG. 9, the general-purpose computer 910 is coupled to each of a speaker 924, a display device 930, an input 932, and an external storage medium 936. The speaker 924 may be implemented using one or more speakers, internal to the computing device 910 or external to the computing device 910, such as in a stereo or surround sound system.

The display device 930 may be a computer monitor, such as a cathode ray tube screen, plasma screen, or liquid crystal display (LCD) screen. The display 930 may receive information from the computer 910 in a conventional manner, wherein the information is presented on the display device 930 for viewing by a user. The display device 930 may optionally be implemented using a touch screen to enable a user to provide input to the general-purpose computer 910. The touch screen may be, for example, a capacitive touch screen, a resistive touchscreen, a surface acoustic wave touchscreen, or the like.

The input device 932 may be a keyboard, a mouse, a stylus, drawing tablet, or any combination thereof, for receiving input from a user. The external storage medium 936 may include an external hard disk drive (HDD), an optical drive, a floppy disk drive, a flash drive, solid state drive (SSD), or any combination thereof and may be implemented as a single instance or multiple instances of any one or more of those devices. For example, the external storage medium 936 may be implemented as an array of hard disk drives.

The I/O interfaces 920 facilitate the exchange of information between the general-purpose computing device 910 and other computing devices. The I/O interfaces may be implemented using an internal or external modem, an Ethernet connection, or the like, to enable coupling to a transmission medium. In the example of FIG. 9, the I/O interfaces 922 are coupled to a communications network 938 and directly to a computing device 942. The computing device 942 is shown as a personal computer, but may equally be practised using a smartphone, laptop, or a tablet device. Direct communication between the general-purpose computer 910 and the computing device 942 may be implemented using a wireless or wired transmission link.

The communications network 938 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The general-purpose computer 910 is able to communicate via the communications network 938 to other computing devices connected to the communications network 938, such as the mobile telephone handset 944, the touchscreen smartphone 946, the personal computer 940, and the computing device 942.

One or more instances of the general-purpose computer 910 may be utilized to implement a server acting as the content provisioning platform 350 shown in FIG. 3 and described in relation thereto. In such an embodiment, the memory 914 and storage 916 are utilized to store data relating to customers, available inventory as discerned from the inventory provider server 370, and the like. The memory 914 and storage 916 are utilized to store one or more machine learning models to implement the predictor module 354. Further, the memory 914 and storage 916 are utilized to store a set of rules and/or logic to be applied by the selector module 356 to filter available inventory and select contextually relevant content to provide to the e-commerce website 320 based on at least one of a context attribute and a consumer attribute. Software for implementing the contextual prediction system is stored in one or both of the memory 914 and storage 916 for execution on the processor 912. The software includes computer program code for implementing method steps in accordance with the method for presenting contextually relevant content described herein.

Embodiments of the present disclosure are not limited to any particular implementation or programming technique and the invention may be implemented using any appropriate techniques for implementing the functionality described herein. Furthermore, embodiments are not limited to any particular programming language or operating system.

Figure 10:
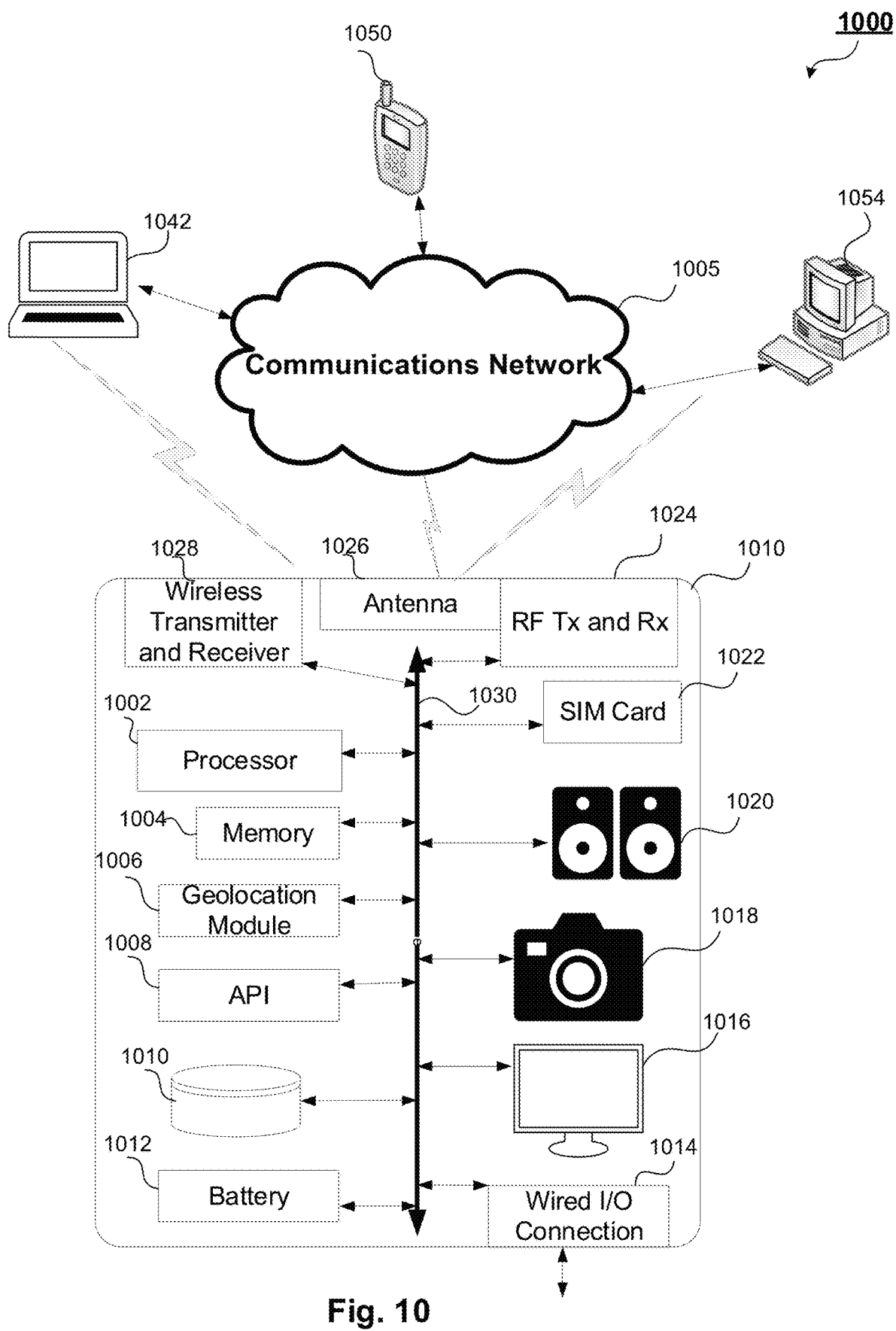
FIG. 10 is a schematic block diagram representation of a system that includes a general smartphone on which one or more embodiments of the present disclosure may be practised.

FIG. 10 is a schematic block diagram representation of a system 1000 on which one or more aspects of a content predictor system the present disclosure may be practised. The system 1000 includes a portable computing device in the form of a smartphone 1010, which may be used by a customer to access, browse and interact with the host website 340 of FIG. 3.

The smartphone 1010 of FIG. 10 includes a plurality of components, including: a processor 1002, a memory 1004, a geolocation module 1006, an Application Programming Interface (API) module 1008, a storage medium 1010, a battery 1012, a wired input/output (I/O) connection 1014, a display screen 1016 (such as a capacitive touchscreen), one or more cameras 1018, one or more speakers 1020, a subscriber identity module (SIM) card 1022, a radio frequency (RF) transmitter and receiver 1024, an antenna 1026, and a wireless transmitter and receiver 1028 (such as a Wi-Fi and/or Bluetooth transmitter and receiver). Components of the smartphone 1010 generally communicate using one or more bus connections 1030 or other connections therebetween.

The wired I/O connection 1014 is adapted to couple the smartphone 1010 to a power outlet or charging device to recharge the battery 1012 or to couple the smartphone to a computing device, such as the general-purpose computer 610 of FIG. 6. The wired I/O connection 1014 may include one or more connectors and may be adapted to enable uploading and downloading of content from and to the memory 1004, storage medium 1010 and SIM card 1022.

The memory 1004 may include Random Access Memory (RAM), Read Only Memory (ROM), or a combination thereof. The storage medium 1010 may be implemented as one or more of a solid state "flash" drive, a removable storage medium, such as a Secure Digital (SD) or microSD card, or other storage means. The storage medium 1010 may be utilized to store one or more computer programs, including an operating system, software applications, and data. In one mode of operation, instructions from one or more computer programs stored in the storage medium 1010 are loaded into the memory 1004 via the bus 1030. Instructions loaded into the memory 1004 are then made available via the bus 1030 or other means for execution by the processor 1002 to implement a mode of operation in accordance with the executed instructions.

The geolocation module 1006 may be used to determine a geographical position of the smartphone 1010, such as based on Global Positioning System (GPS) satellites, cellular telephone tower triangulation, or a combination thereof. The determined geographical position may then be made available to one or more programs or applications running on the processor 1002 for use within those programs or applications or to be shared to external computing devices and systems.

The wireless transmitter and receiver 1028 may be utilized to communicate wirelessly with external peripheral devices via Wi-Fi, Bluetooth, infrared, or other wireless protocol. In the example of FIG. 10, the smartphone 1010 is coupled wirelessly to a personal computer 1042.

The wireless transmitter and receiver 1028 and/or the RF transmitter and receiver 1024, in conjunction with the antenna 1026, are adapted to couple the smartphone 1010 to available communications networks 1005. The communications network 1005 may be implemented using one or more wired or wireless transmission links and may include, for example, a cellular telephony network, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a cellular (mobile) telephone cellular network, a short message service (SMS) network, or any combination thereof.

In one implementation, the SIM card in conjunction with the RF transmitter and receiver 1024 enable the smartphone 1010 to couple to a cellular communications network and then, in turn, to the Internet. Alternatively, or additionally, the smartphone 1010 utilizes the wireless transmitter and receiver 1028 to couple the smartphone to a local wireless network that is, in turn, coupled to a communications network, such as the Internet. In this way, the smartphone 1010 is able to communicate with other computing devices coupled to the communications network 1005, such as the second smartphone 1050, the personal computer 1042, and the personal computer 1054.

In one example, the display device 1016 is implemented using a liquid crystal display (LCD) screen. The display 1016 is used to display content to a user of the smartphone 1010. The display 1016 may optionally be implemented using a touch screen, such as a capacitive touch screen or resistive touchscreen, to enable a user to provide input to the smartphone 1010.

The SIM card 1022 is utilized to store an International Mobile Subscriber Identity (IMSI) and a related key used to identify and authenticate the user on a cellular network to which the user has subscribed. The SIM card 1022 is generally a removable card that can be used interchangeably on different smartphone or cellular telephone devices. The SIM card 1022 can be used to store contacts associated with the user, including names and telephone numbers. The SIM card 1022 can also provide storage for pictures and videos. Alternatively, contacts can be stored on the memory 1004 or the storage medium 1010.

The system disclosed herein provides an improved computer system in the form of a content predictor for selecting content to be displayed in a set of predefined content positions within a webpage during an electronic transaction.

INDUSTRIAL APPLICABILITY

The arrangements described are applicable to the information technology and retail industries and particularly for e-commerce.

The foregoing describes only some embodiments of the present invention, and modifications and/or changes can be made thereto without departing from the scope and spirit of the invention, the embodiments being illustrative and not restrictive.

Reference throughout this specification to "one embodiment", "an embodiment", "some embodiments", or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

While some embodiments described herein include some, but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

Note that when a method is described that includes several elements, e.g., several steps, no ordering of such elements, e.g., of such steps, is implied, unless specifically stated.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

Similarly, it is to be noticed that the term coupled should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply direction. Hence, the expression "a device A is coupled to a device B" may be synonymous with the expression "a device B is coupled to a device A". "Coupled" may mean that two or more elements are either in direct physical or electrical contact, or that two or more elements are not in direct contact with each other but yet still co-operate or interact with each other.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Although the invention has been described with reference to specific examples, it will be appreciated by those skilled in the art that the invention may be embodied in many other forms.

The invention claimed is:

1. A computer-implemented electronic publishing content selection system for use in relation to online electronic transactions, said electronic publishing content selection system comprising:
   a widget encoded on a webpage displayed on a user computing device during an online electronic transaction, said widget configured to:
      send a widget request, via a communications network, for content to be displayed on said webpage, and
      display content on said webpage based on a received selector response; and
   a computer-implemented content selection engine coupled to said communications network, said content selection engine including:
   (i) a selector module coupled to a customer data platform that stores customer information, wherein, on receipt of a widget request, said selector module sources customer information from said customer data platform and sends a predictor request based on said customer information and a set of available content items; and
   (ii) a programmed content predictor engine configured, on receipt of said predictor request, to:
      select, from a predefined set of page variants, a page variant for said webpage, the page variant defining a number of content placements, each content placement having a number of content positions;
      build a permutation quality table for said webpage, based on:
         (i) said selected page variant; and
         (ii) said set of available content items;
         wherein said each entry in the permutation quality table corresponds to a unique content position-content item combination;
      populate each entry in said permutation quality table with a quality score determined by a quality score machine learning model; and
      determine a page score for each permutation of content position-content item combinations, based on said quality scores;
      select a permutation of content position-content item combinations having a highest page score; and
      send a predictor response to said selector indicating which content items are to be displayed in the respective content positions of the webpage, based on the selected permutation having the highest page score;
   wherein on receipt of said predictor response, said selector module forwards a selector response to said widget, via said communications network, indicating the content items to be displayed in the respective content positions of the webpage.

2. The content selection system according to claim 1, wherein said page variant defines locations within the webpage upon which each content placement and content position is to be displayed.

3. The content selection system according to claim 1, wherein said quality score machine learning model is implemented using one of linear regression, neural network, and lightGBM.

4. The content selection system according to claim 1, wherein said quality score machine learning model is a set of machine learning models.

5. The content selection system according to claim 4, wherein said set of machine learning models includes a page variant selection model utilized by the content predictor engine to select said page variant from a set of page variants based on at least one of a page archetype associated with said webpage, historical data associated with each page variant in said set of page variants, and historical data associated with different page archetypes.

6. The content selection system according to claim 4, wherein said set of machine learning models includes:
a click model for determining a click through rate for each content item, based on historical click data and impressions,
a bid price model for modifying a bid price associated with a content item, based on historical bid price data and a predefined target,
a ranking model for determining a predicted paid price for each content item based on historical spending data, and
a budget model for controlling spending associated with a content item, based on historical spending data,
wherein said content predictor engine further includes a model prediction model that determines a click through rate and bid price for each content item by utilizing each of said click model, said bid price model, said ranking model, and said budget model,
the quality score for each content item being based on the respective click through rate and bid price.

7. The content selection system according to claim 1, wherein said content predictor engine is further configured to remove content items having a quality score below a predefined minimum quality score threshold.

8. The content selection system according to claim 1, wherein the content predictor engine is further configured to identify a top candidate content item for each content position.

9. The content selection system according to claim 1, wherein said content predictor engine is further configured to swap content items between content positions, based on predicted rankings.

10. A computer-implemented machine learning-based content predictor system adapted for use in online electronic transactions, said content predictor system comprising:
a machine learning quality score model for determining a quality score for content items to be displayed during an online transaction;
a programmed content predictor engine configured to:
build a permutation quality table based on:
(i) a selected page variant, wherein said page variant defines a number of content placements for a webpage to be displayed during an online transaction, each content placement having a number of content positions; and
(ii) a set of available content items;
wherein said each entry in the permutation quality table corresponds to a unique content position-content item combination;
consume said quality score model to generate a quality score for each of said content items; and
populate each entry in said permutation quality table with said quality scores determined by said quality score machine learning model;
wherein said content predictor engine includes:
a ranking engine configured to:
determine a page score for each permutation of content position-content item combinations, based on said quality scores;
select a permutation of content position-content item combinations having a highest page score; and
further wherein said predictor outputs said selected permutation of content position-content item combinations having a highest page score for display on a webpage.

11. The content predictor system of claim 10, further comprising:
a page variant selection engine that utilizes a machine learning revenue model to select said selected page variant from a set of page variants, based on at least one of a page archetype associated with a webpage for which a predictor request has been received, historical data associated with different page variants, and historical data associated with different page archetypes.

12. The content predictor system of claim 10, wherein said page variant defines locations within the webpage upon which each content placement and content position is to be displayed.

13. The content predictor system according to claim 10, wherein said quality score machine learning model is implemented using one of linear regression, neural network, and lightGBM.

14. The content predictor system according to claim 10, wherein said quality score machine learning model is a set of machine learning models.

15. The content predictor system according to claim 14, wherein said set of machine learning models includes:
a click model for determining a click through rate for each content item, based on historical click data and impressions, and
a bid price model for modifying a bid price associated with a content item, based on historical bid price data and a predefined target,
a ranking model for determining a predicted paid price for each content item based on historical spending data, and
a budget model for controlling spending associated with a content item, based on historical spending data, and
wherein said predictor further includes a model prediction model that determines a click through rate and bid price for each content item by utilizing each of said click model, said bid price model, said ranking model, and said budget model,
the quality score for each content item being based on the respective click through rate and bid price.

16. The content predictor system according to claim 14, wherein said predictor is further configured to remove from said permutation quality table content items having a quality score below a predefined minimum quality score threshold.

17. The content predictor system according to claim 14, wherein the predictor is further configured to identify a top candidate content item for each content position.

18. The content predictor system according to claim 17, wherein said predictor is further configured to swap said identified top candidate content items between content positions, based on predicted rankings.

19. The content predictor system according to claim 18, wherein the selected permutation of content position-content item combinations having a highest page score is based on said identified top candidate content items.

* * * * *